United States Patent [19]

Barton

[11] 4,124,205
[45] Nov. 7, 1978

[54] DOCUMENT HANDLING

[75] Inventor: Roy G. H. Barton, Cinderford, England

[73] Assignee: Xerox Corporation, Stamford, Conn.

[21] Appl. No.: 780,890

[22] Filed: Mar. 24, 1977

[30] Foreign Application Priority Data

Jun. 25, 1976 [GB] United Kingdom ............... 26583/76

[51] Int. Cl.² .............................................. B65H 9/10
[52] U.S. Cl. .................................... 271/233; 271/248
[58] Field of Search ............... 271/226, 233, 234, 236, 271/238, 248

[56] References Cited

U.S. PATENT DOCUMENTS

| 2,657,051 | 10/1953 | Waechter | 271/248 |
|---|---|---|---|
| 2,726,864 | 12/1955 | Waechter | 271/248 |
| 2,811,354 | 10/1957 | Runyon | 271/233 |

Primary Examiner—Richard A. Schacher

[57] ABSTRACT

An apparatus for the registration of documents on the platen of a photocopier is disclosed. The apparatus is in the form of a registration edge against which an edge of a document may be positioned. The registration edge is formed by a generally channel-shaped member of resilient material extending along an edge of the platen and fitted over the platen edge with the sides thereof gripping the opposite faces of the platen.

6 Claims, 7 Drawing Figures

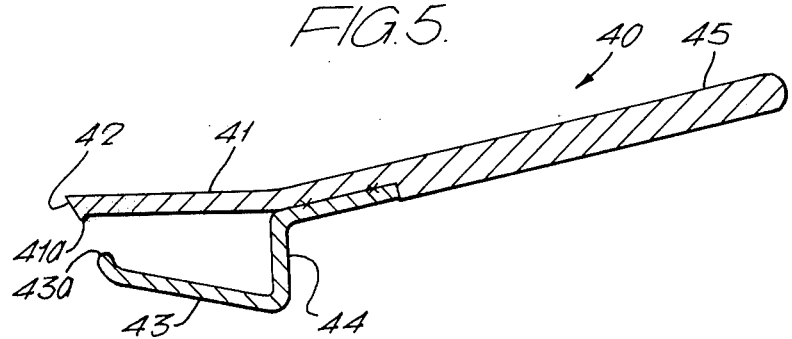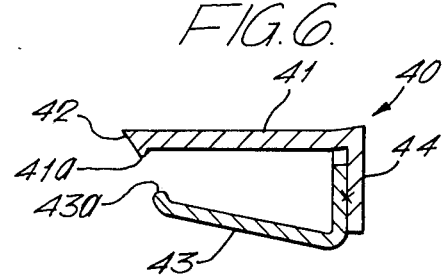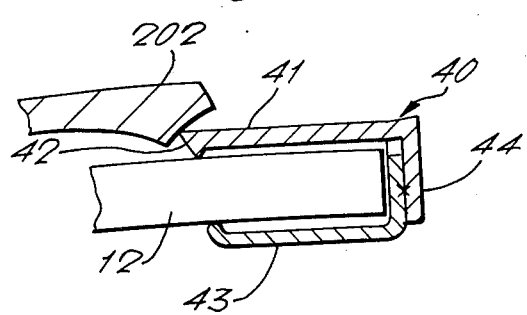

DOCUMENT HANDLING

BACKGROUND OF THE DISCLOSURE

I. Field of the Invention

The invention relates to handling documents and particularly to the registration of documents on the platen of a photocopier.

II. Description of the Prior Art

It is important to be able quickly and accurately to move documents to a registered position on the platen of a photocopier. Registration of the document is necessary to assure the production of a complete and visually acceptable copy. If the document is situated on the platen in a skewed or misaligned position within the area, the copy will reflect this same skew or misalignment and may be incomplete and/or unacceptable to the user. The avoidance of skew is particularly important in an automatic document handler by which sheets are moved in sequence into a registered position on the platen and then moved out of that position to make way for the next sheet.

In order to reduce the incidence of skew in an automatic document handler, it has previously been proposed to register the document against a stop, the document being driven over the platen surface by a belt drive. Particularly good results have been achieved by apparatus as proposed in copending Application Ser. No. 687,062, filed May 17, 1976 and assigned to the same assignee as the present invention in which the belt is narrow relative to the surface and is centrally located over the surface whereby in operation the belt engages a generally centrally located portion of a document to move the latter over the surface.

The stop conveniently takes the form of a registration strip extending along one edge of the platen. Previously used registration strips which rest on the surface of the platen near the edge suffer from the disadvantage that unless the strip is specially machined or otherwise carefully formed, it will not be in continuous contact with the smooth platen glass. The result of irregularities in the strip is to cause spaces between the strip and the platen in which the edge of a document may become trapped. This problem has in the past been solved by inserting a plastic filler in the gap but an alternative and simpler solution is now proposed.

SUMMARY OF THE INVENTION

The invention consists in a photocopier including a platen for receiving documents carrying information to be copied and a registration edge, against which an edge of a document may be positioned, formed by a generally channel-shaped member of resilient material extending along an edge of the platen and fitted over the edge with the sides thereof gripping the opposite faces of the platen.

The registration member is suitably of a resilient plastics material with a low creep characteristic and one or more of the members may extend along two or more edges of the platen.

Advantageously, the channel side forming the registration edge has an inturned slip along the extremity thereof to ensure uniform contact with the platen surface. Preferably the other channel side is also formed with an inturned lip.

In the case of a copier having an automatic document handler which feeds documents onto the platen over the registration member, the member may be formed with a document guide.

BRIEF DESCRIPTION OF THE DRAWINGS

In order that the invention may be more readily understood, reference will now be made to the accompanying drawings in which:

FIG. 5 is a section along the line A—A of FIG. 4;

FIG. 6 is a section along the line B—B of FIG. 4; and

FIG. 7 is a section like that of FIG. 6 showing the member fitted over the platen edge.

DESCRIPTION OF THE PREFERRED EMBODIMENTS

Figure 1:
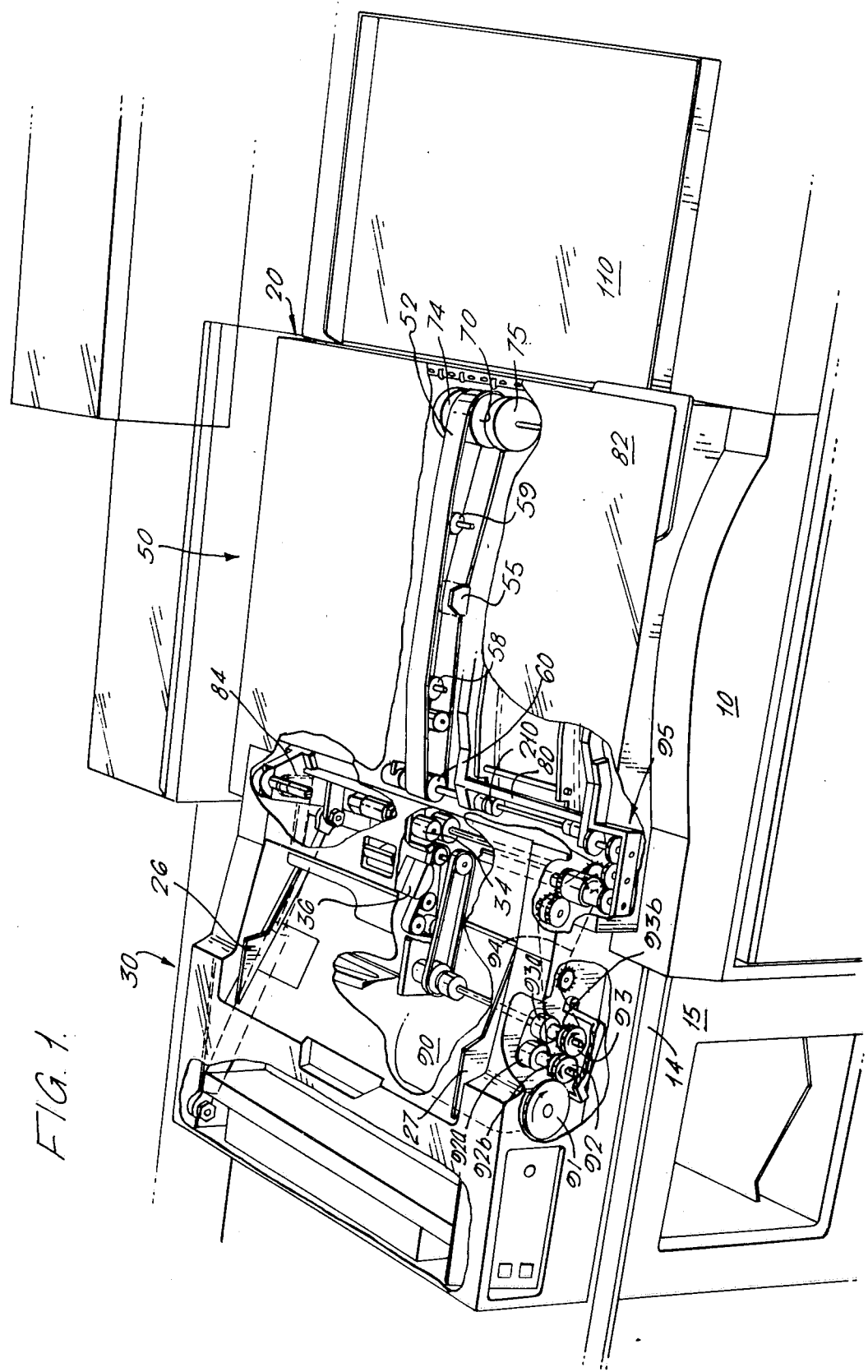
FIG. 1 is a perspective view of a document handling apparatus in position on the platen of an electrostatographic copier with parts of the apparatus broken away to show greater detail.
Figure 2:
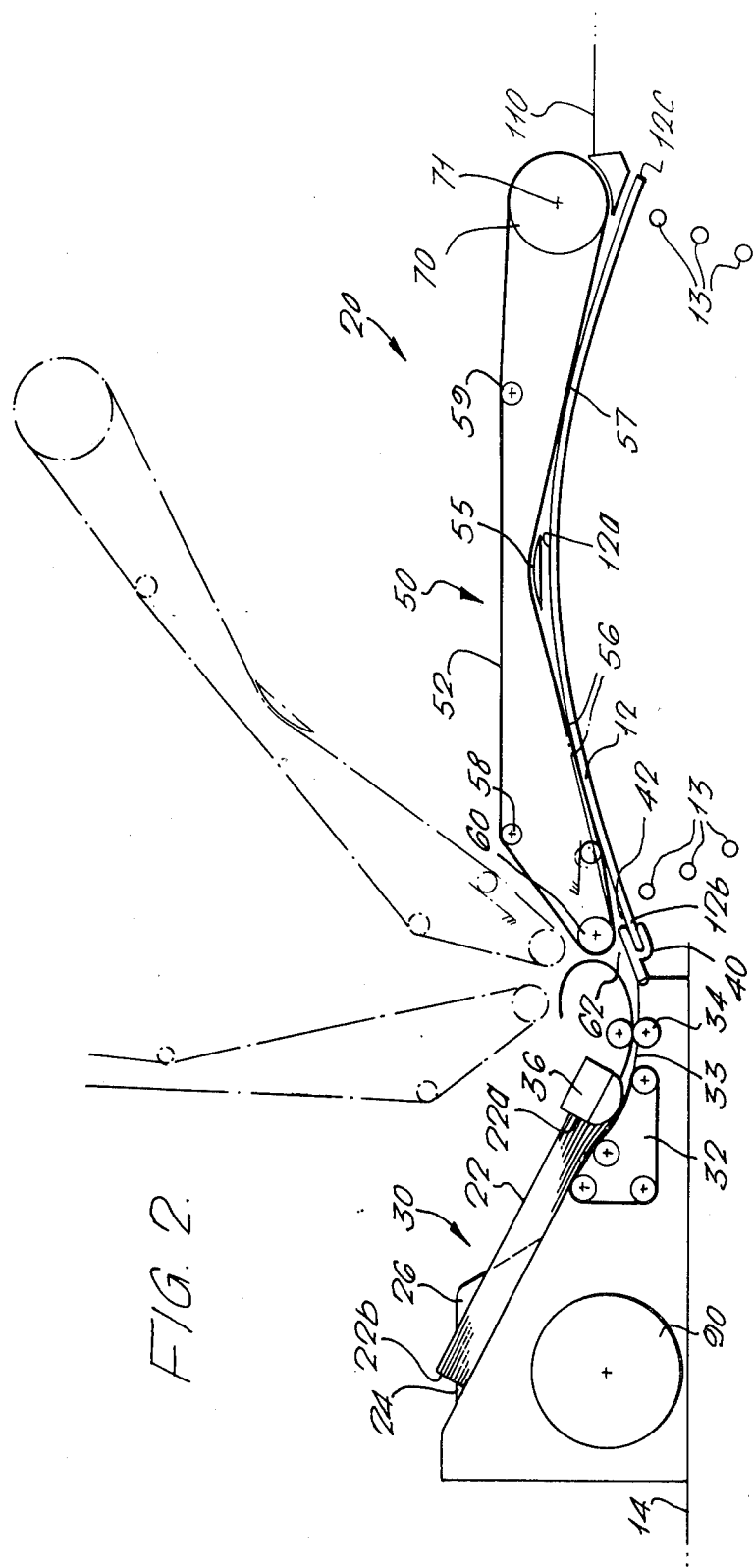
FIG. 2 is a schematic cross-section of the apparatus of FIG. 1.

Referring to FIGS. 1 and 2 of the drawings there is shown a portion of an automatic electrostatic reproduction machine 10 of the kind disclosed for example in U.S. Pat. No. 3,301,126 including a document handling apparatus 20 overlies a work station comprising an exposure area or platen 12 of the machine 10 and extends over an upper surface 14 of a document output or sorter extension 15 of the machine. The document handler 20 is synchronised with the control of the machine 10 automatically to feed seriatim documents to be copied to the platen 12, register each document and hold it in a position on the platen until a selected number of copies has been produced by the machine 10 and then remove it from the platen while feeding the next document to be copied. One method of producing the copies by the machine 10 will be understood for example by reference to the above mentioned U.S. Pat. No. 3,301,126 from which it will be seen that the platen 12 is illuminated from below as suggested by the lamps 13 in FIG. 2 and the image on an upper surface 12a of the platen reflected on to a photoconductive surface (not shown) where the image is developed and from which it is transferred to a suitable substrate to produce the copy.

Document handler 20 generally comprises a sheet material feeder 30 and a document transport 50. The feeder 30 includes a supply tray 24 for cut-sheet documents, and a sheet separator mechanism 32 and a pair of advancing or pinch rolls 34 by which the documents are fed one at a time from a stack of documents in the tray 24 to the document transport 50.

For specific details of an embodiment of a sheet separator 32 which has been found to perform particularly well in this environment reference may be made to our copending application No. 43932/75, U.S. Ser. No. 687,058, filed May 17, 1976.

In operation, documents 22 which may be ordinary cut sheets of paper having generally parallel and straight forward and rear edges 22a, 22b respectively, are placed face down for copying in the inclined tray 24 so that the forward edge 22a of the documents will be held normal to the direction of document travel by a suitable restraining member 36.

The alignment of documents by the document feeder 30 relative to the exposure station 12 is preferably such that the centre line of the documents remains at generally the same position regardless of the width of the document. This alignment is provided in this embodiment by a pair of self-centring side guides 26 and 27 on opposite sides of the supply tray 24 which restrain the side edges of the documents generally parallel to the direction of feed and feed documents from a central area of the stack or pile regardless of the width of the stack.

With the documents in place and the processor 10 set to make the required number of copies of each document 22, automatic operation is initiated by activation of the "start print" control of the processor 10.

From its position on the bottom of the document pile in tray 24 the first document is separated from the remainder of the stack by the separator 32 and fed forward over a guide 33 so that its forward edge 22a enters the nip of the driven pinch rolls 34 which latter pull the document 22 completely from the tray and move its forward edge 22a over a registration member 30 and under the control of the transport 50.

The document transport 50 comprises an endless belt 52 riding over and extending between rollers 60 and 70. The belt 52 is driven via the roller 60 which may be rotated in two directions. Anti-clockwise rotation of roller 60 drives the belt "forwards" to advance a document across the platen 12. Clockwise rotation "reverses" the belt for registering the rear edge of a document against the registration member 40. The rollers 60 and 70 rotate on shafts 61 and 71 respectively which are mounted on a movable frame 80 located centrally along opposite sides 12b and 12c of the platen upper surface 12a so that the belt entrained thereover extends across the central portion of the platen or processing station 12. The belt itself is narrow relative to the platen as proposed in our copending application No. 43930/75 (U.S. Ser. No. 687,062 filed May 17, 1975). The frame 80 supports a suitable outer cover 82 which hides the moving parts and prevents light from entering the platen 12.

Advantageously the roller 60 is of small diameter (e.g. 1.5 inches) so that a nip 62 between the belt 52 entrained thereover and the platen surface 12a may be as close as necessary to the edge 12b of the platen and to the paper feeder 30. The belt 52 rests on the platen surface 12a and is made of a material such as silicon rubber on a flexible backing and is preferably white on its outer surface and has a high coefficient of friction with paper type materials, e.g. 1.0-1.t. The platen surface 12a will usually be smooth glass so that its coefficient of friction with the paper or belt is relatively low e.g. less than 1.0. Consequently, a document in the form of a material with a relatively high coefficient of friction such as paper for example, will be effectively gripped by the belt 52 on its upper side when it is fed into the nip 62 and caused to slide over the surface 12a on its lower side under the control of the belt 52.

Figure 3:
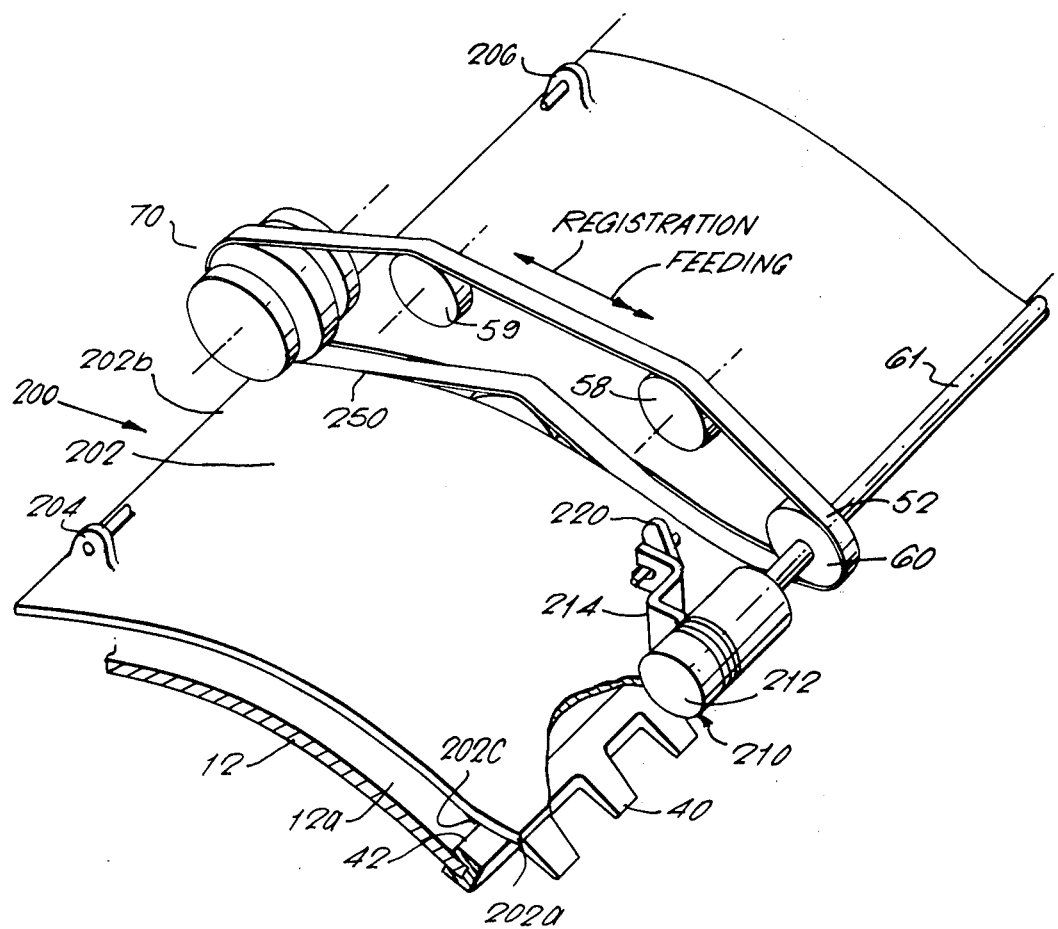
FIG. 3 is a schematic perspective of part of the apparatus of FIG. 1.
Figure 4:
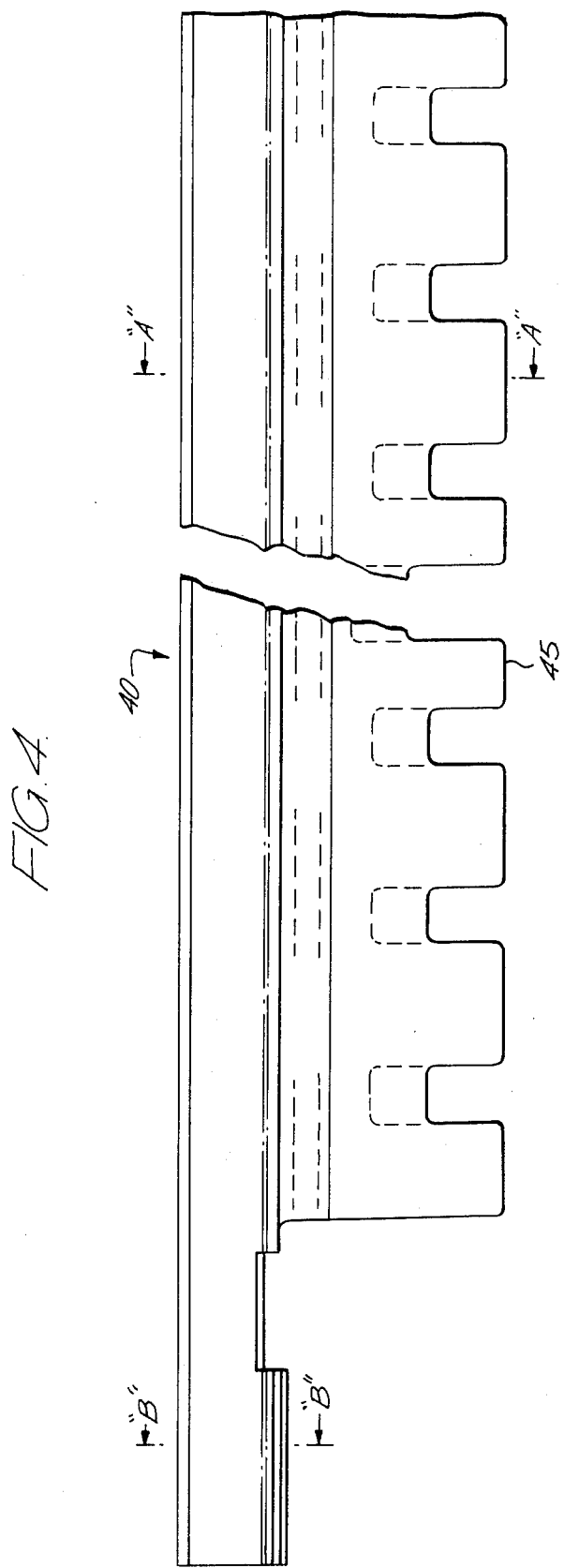
FIG. 4 is a partial view of a registration member in accordance with this invention.

Registration member 40 functions to align documents in a predetermined relationship and extends along platen edge 12b. Member 40 is arranged so that documents being fed toward the platen 12 in a first direction pass smoothly thereover; however, it includes an edge 42 raised above the surface 12a so that once a document has passed thereover and is moved in reverse direction, a trailing edge 22b of the document held against the surface 12a will abut thereagainst. As shown broadly in FIG. 3, a baffle 200 may be provided to assure proper abutment of the document edge against the registration edge 42 by preventing the document edge riding back over the registration edge 42.

The baffle 200 includes a member generally indicated at 202 overlying the processing station 12 and extending on opposite sides of the belt 52. The member 202 has a first edge portion 202a overlying the registration member 40 and a second opposite edge portion 202b, pivotally mounted to the frame 80 by means of hinge portions 204 and 206. The portion 202a of member 202 is movable into and out of operative engagement with the registration member 40 by a lift mechanism generally indicated at 210 that is connected with a drive shaft 61 for said transport roller means 60 through a clutch 212.

The clutch 212 transmits a portion of the rotary motion of the drive 61 in the direction indicated by the labelled arrow during feeding drive to a lift arm 214 that co-acts with a bracket 220 on the baffle to pivot the latter upwardly and raise edge portion 202a above member 40. In this raised position a sheet of material may pass under the baffle and over the registration member 40 onto the surface 12a. When the drive reverses to move the belt in the registration direction as indicated by the labelled arrow, the clutch pivots arm 214 downwardly to move the baffle tight against the portion 40 thereby causing the trailing edge 22b of document 22 to abut the edge 42 and preventing its movement therepast. As seen best in FIG. 5, the baffle 202 has a guide ridge portion or lip 202c to urge the document edge aginst the lower portion of the registration edge 42.

The registration member 40 will now be described in greater detail. In accordance with the invention, the registration member is generally U- or channel-shaped in cross-section and clips over the edge of the platen glass 12. The channel-shaped member 40 is formed of resilient plastics material and has side walls 41 and 43 connected by a base portion 44. The side walls grip the opposite faces of the platen glass and in order that the gripping force be applied at the registration edge 42 and ensure uniformity of contact of the edge with the platen glass, inturned lips 41a and 43a are provided along the extremities of the walls 41, 43. As seen in FIGS. 5 to 7 the wall is slightly shorter than the wall 41 and in the relaxed condition of the member the lips 41a 43a, face towards one another. The registration edge 42 tapers inwardly towards the platen glass as will be seen from FIG. 7. It will also be seen that the wall 41 defining registration edge 42 is slightly thicker than the wall 43 so that the wall 43 will flex more easily as the member is clipped over the edge of the platen glass.

In the embodiment illustrated the member 40 is formed with an integral finned guide plate 44 for documents fed over the member onto the platen. The guide plate 44 extends generally in line with the channel wall 41. For convenience of manufacture the registration member shown is formed by two extrusions welded together but it will be understood that the member may equally be manufactured in one piece as a moulding or extrusion. The registration member is of a plastics material having a low creep characteristic, such as Nylatron (trademark), and conform to and continuously contacts the platen without relaxing with time.

A Schematic illustration of how the transport 50 moves out of position to allow access to the platen area 12 for manual use or cleaning is set forth by the dotted lines in FIG. 2 which show the mechanism in a generally half open position and also in a fully open position.

As may be understood from FIG. 1 the frame means 80 pivots about an axis 84 that is spaced above the platen 12 to allow full opening extending the frame 80 upwardly about 90°.

A hitch 55 from the belt 52 is positioned on the outside of the belt 52 to support the belt above the platen 12 at an intermediate point between the rollers 60, 70 so that the belt contacts the platen surface 1s at two separated contact areas 56, 57 spaced along its length, i.e., in the direction of travel of the belt. Preferably, as shown, the intermediate point is generally halfway between the rollers.

Idler rollers such as shown at 58, 59 may be provided as required at other positions along the length of the belt means 52. These may be positioned to adjust belt tension.

Further details of hitch 55 are given in our copending Application Ser. No. 687,062, filed May 17, 1976 and assigned to the same assignee as the present invention and a preferred form of hitch is described in our copending Application Ser. No. 780,894 filed concurrently herewith entitled Document Handling Apparatus and assigned to the same assignee as the present invention.

By using a narrow belt 52 with crowned rollers 60, 70 construction is greatly simplified in that no side guides are required and tracking problems are greatly reduced compared with a wide belt. We have found that a narrow belt of greater than a 35-1 length to width ratio tracks very well without any guides and does not tend to cause the document to skew.

Operating the belt 52 is a stable condition on crowned pulleys or rollers 60, 70 without edge guides eliminates belt edge wear and possible detracking which may occur under unstable conditions. Accordingly, maintenance is minimized. The roller 60 may advantageously be rubber tyred to improve traction.

Ejection of documents from the platen 12 is initiated by the belt 52. However, the final push on to an output tray 110 is assisted by a pair of ejection rollers 74, 75 which are coaxial with the second roller 70. The pair of ejection rollers avoid skewing the document during ejection to provide a neat readily collectable output.

Power to drive the paper feeder 30 and the belt transport 50 is supplied by a motor 90 which may advantageously be located under the document tray 24. Rotary motion is transmitted from the motor drive gear 91 to a pair of counter rotating gears 92, 93 which in turn are each connected via clutches 92a, 93a to chain drive sprockets 92b, 93b respectively whereby alternate engagement of the clutches will transmit counter-clockwise or clockwise rotation respectively to a chain drive 94. A clutch surface between the gears 92, 93 and sprockets 92b, 93b, is engaged or disengaged by a clutch which is electrically energised in response to machine control logic. The chain drive 94 in turn causes the pinch rolls to drive intermittently and a series of interconnected gears generally indicated at 95 alternately to drive axis 61 and the first roller 60 in opposite first and second directions.

In operation, as the sheet feeder 30 begins to separate and feed a document 22, the platen baffle 200 is raised to open a document entrance gap below it and above the registration member 40 so that documents advanced by the pinch rolls 34 will enter the gap. When the pinch rolls 34 pass the forward or leading edge 22a of a document toward the nip 62 of the document transport 50 a sensing switch located between them is tripped which causes a trailing edge 22b of the document to be detected after which by a small delay the baffle 200 is caused to close against member 40 and the belt 52 is caused to reverse to the second direction. The reverse movement of the belt is timed to allow the trailing edge to abut the registration surface 42 and cause the belt 52 to slip over it briefly to assure full registration and correction of any skew.

Closure of the baffle 200 against the registration member 40 prevents movement of the trailing edge 22b over the registration edge 42 and minimizes the opportunity of the document 22 to buckle. In practice paper weights in a limited range of 47 to 120 grams per square meter have been very successfully handled giving rise to the belief that a much greater range may be accommodated.

Accurate registration of the document 22 on the exposure surface 12 is essential in that the relationship between a document to be copied, the mechanism by which it is to be copied and the material onto which it is to be copied are very precisely predetermined so that if registration is off the copy will not, in most cases of 1:1 copying onto document sized paper, include all of the original document. Even where document margins are such that essential information would not be lost as a result of misregistration nevertheless the aesthetics and integrity of copy would be severely reduced in the eyes of a reader.

After the document has been registered the predetermined number of copies are made and the logic control activates the document handler 20 to eject the copied document and (not shown) in the tray 24 detects the absence of documents and automatically stops the apparatus.

Although a preferred embodiment of the invention has been described it will be understood that various modifications may be made without departing from the scope of the claims. For example, two or more parallel narrow belts may be used in place of the single belt described.

While the preferred embodiment described has included a curved platen it will be understood that a flat platen or other processing station configuration may be used instead. Moreover, it will be understood that the terms — "platen and exposure area" are intended to include any work station where a sheet of material is to be positioned so far as practical in a predetermined place. Thus, generally it matters not for what reason the sheet material is so positioned or the specific act performed upon it. For example, the "exposure" may include electronic scanning or magnetic read off.

I claim:

1. A photocopier including a platen for receiving documents carrying information to be copied and an inwardly tapered registration edge against which an edge of a document may be positioned, said registration edge being formed by a generally channel-shaped member of resilient material extending along an edge of the platen and fitted over the platen edge with the sides thereof gripping the opposite faces of the platen.

2. Apparatus according to claim 1 wherein the channel side forming the registration edge has an inturned lip along the extremity thereof.

3. Apparatus according to claim 2 wherein the other channel side has an inturned lip facing the lip on the first channel side.

4. Apparatus according to claim 1 wherein the registration member is formed of resilient plastics material with a low creep characteristic.

5. Apparatus according to claim 4 wherein the channel side forming the registration edge is less flexible than the other channel side.

6. Apparatus according to claim 1 wherein the registration member is formed with an integral document guide.

* * * * *